June 25, 1935.   H. T. DURANT   2,006,131
FILTER PRESS
Filed Oct. 11, 1933   2 Sheets-Sheet 1
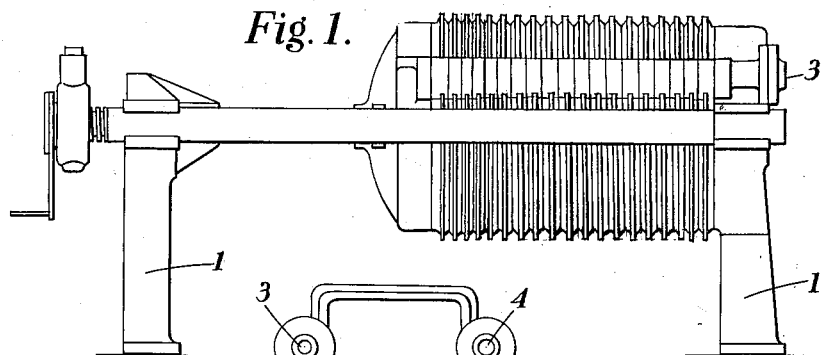
Fig. 1.
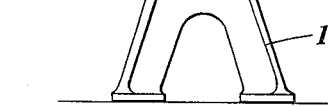
Fig. 2.
Fig. 3.
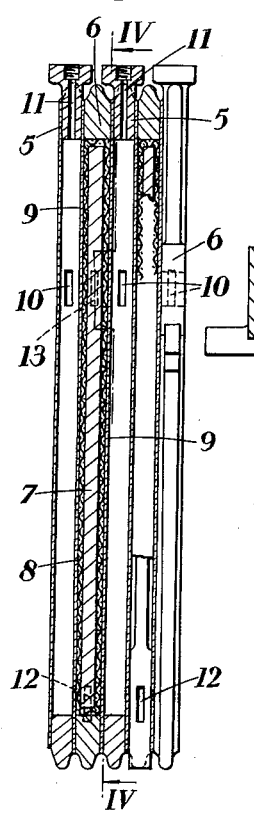
Fig. 4.
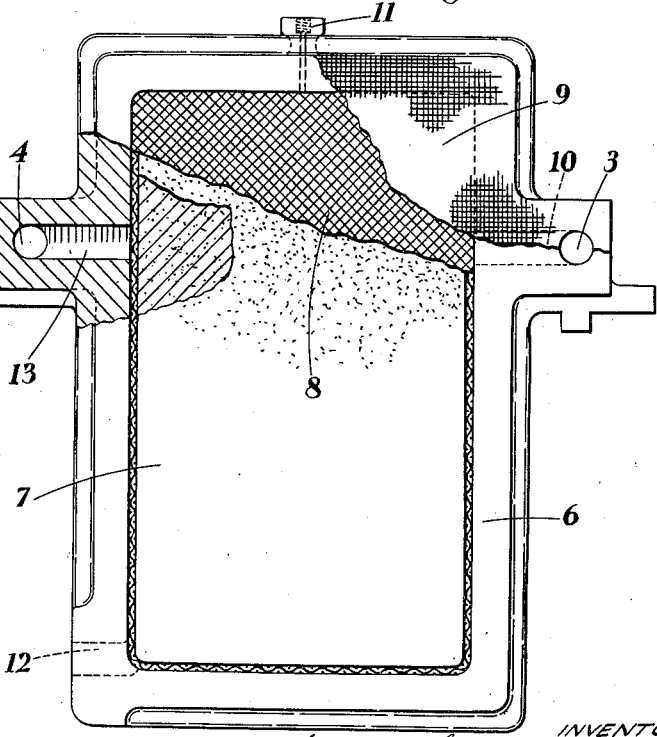
INVENTOR
Henry Thomas Durant
BY
Frank S. Appleman
ATTORNEY

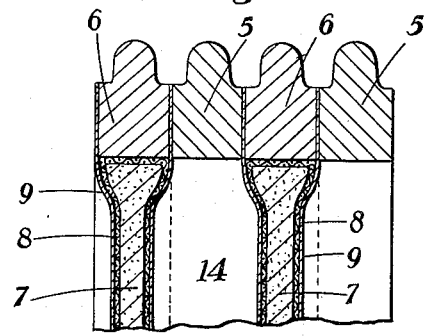
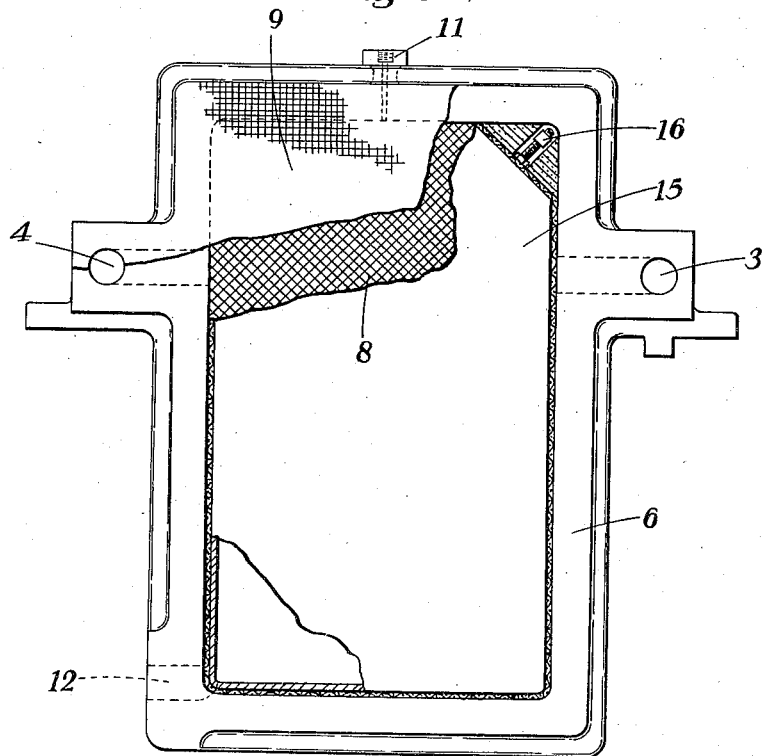

Patented June 25, 1935

2,006,131

UNITED STATES PATENT OFFICE 2,006,131

FILTER PRESS

Henry Thomas Durant, Crawley, England, assignor to Blomfield Engineering Company Limited, London, England, a British company Application October 11, 1933, Serial No. 693,206
In Great Britain October 26, 1932

11 Claims. (Cl. 210—188)

This invention relates to filter presses having a set of hollow frames or spacing plates with filter cloth sandwiched between them.

The form of filter press most commonly in use consists of a series of plates pressed together and consisting alternately of solid plates with channels formed on their surfaces and of hollow frames or spacing plates. The solid plates are usually of two kinds as regards the ports for the supply of liquid for washing the filter cake. The hollow frames are separated from the solid plates by the filter cloths so that the material to be filtered on being fed to the hollow spaces in the spacing plates becomes split, the filtrate passing through the cloths and escaping by way of the channels on the solid plates and the solid constituent forming cakes on the filter cloths within the spacing frames. The spaces for the cake thus amount to about one half the total volume of the structure. In any early form of the well known Sweetland filter, the whole structure consisted of a series of similar hollow frames, pressed together and provided around their edges with gaskets or packing rings but filter elements were incorporated consisting of wire-mesh units covered with filter cloth and arranged for the filtrate to escape from the interior of each element at its neck into a discharge manifold. It has, however, been proposed to construct a filter press with the spaces or cells in which the filter cake is deposited, separated from one another by collapsible hollow boxes of sheet metal or rubber, which were to collapse on formation of the cake but would be expanded by introducing water under pressure into them.

The object of the present invention is to provide a novel form of filter press in which all the units are similar so that the cost of production shall be low, in which the total capacity for the formation of cake relatively to the total volume of the structure is high and in which means are present for causing the cake to be readily detached from the filter cloths.

According to the present invention, the novel filter press consists of a series of hollow frames pressed together and containing compressible cushions which are themselves inherently resilient and capable of expanding and exerting an appreciable pressure during the whole period of cake formation. Each of the cushions is thus enclosed in the filter cloth and they may be disposed in alternate hollow frames and the ports for the feed of the material to be filtered are formed in the remaining frames and as they are in communication with a supply manifold, the material is fed into the free hollow spaces in the alternate frames in which the cake builds up while the filtrate percolates through the filter cloth into the spaces containing the resilient cushions from which it drains away through outlet ports. The cushions may be made of sponge rubber enclosed in sacking because sponge rubber can be obtained which under quite a low pressure, becomes compressed to a fraction of its normal thickness. Thus one variety when subjected to a pressure of rather less than 2 lbs. per square inch, is reduced to about 25 per cent of its original thickness. However, the cushions may be formed of sheets of perforated soft rubber in which case, as the perforations form air spaces, it is possible to compress the sheets. Again, the cushions may be pneumatic cushions maintained under pressure during the whole time of cake formation or may even have springs enclosed within a suitable cover. The compression of the cushions obviously provides increased space to accommodate the filter cake so that for given dimensions, the novel filter press has a cake capacity much greater than the usual form of press, in fact, a capacity approaching twice that of the normal press.

When the formation of the cake is completed, the filter press is taken down and as the pressure is released, the cushions recover their original size and thus displace the cake which is, therefore, readily detached from the filter cloths.

The novel filter lends itself to the usual method of washing the cake such as is employed in the usual plate and frame filter presses, by opening the escape cocks from alternate frames containing the filter elements and supplying wash water to the remaining frames containing filter elements so as to pass through and wash the cake. However, with the new press, washing may be arranged to take place from one end to the other, the washing liquor passing through successive cakes in series with a consequent saving in washing liquor, or again a system of washing may be employed in which the washing water flows in a number of parallel paths, each path including two or more cakes in series.

The filter elements may be constructed so that the whole filter consists only of the frames containing the resilient cushions, each covered on both sides with filter cloth and with the feed ports arranged so that the feed is pumped between two adjacent filter cloths. In this way the chamber to receive the cake is made by the pressure of the feed.

In order that the invention may be clearly understood and readily carried into effect, some forms of filter press in accordance therewith will now be described with reference to the accompanying drawings in which:—

Figure 1 is a side elevation;

Figure 2 is an end elevation seen from the right of Figure 1 showing the general assembly of one form of the improved filter press;

Figure 3 is a central vertical section through a number of adjacent elements, showing an arrangement of ports for washing the cakes as usually hitherto employed;

Figure 4 is a vertical section at right angles to Figure 3 on the line IV—IV in Figure 3 showing one form of construction;

Figure 5 is an enlarged view corresponding to the upper part of Figure 3 but showing pressure applied to the filter elements, and Figure 6 is a view corresponding to Figure 4 showing a modified form of the elements.

In Figures 1 and 2 the form of construction is shown generally with the pump for feeding the material to be filtered omitted. The structure consists of the usual supporting base 1 arranged with lateral guide members 2 along which the filter elements can slide. The stationary structure on one side contains a passage 3 by which the material to be filtered is fed to the filter press and on the other side a small passage 4 for the supply of washing water.

All the units in this construction consist of hollow frames 5, 6, the frames 6 only containing the filtering elements. Such a frame is shown in detail in Figure 4. The cast iron frame 6 contains the filter element which primarily consists of a pad 7 of sponge rubber which is encased in a bag 8 of jute sacking. On the outside of the jute sacking there is a filter cloth 9 which thus separates the sponge rubber from the open or unoccupied frames 5 on either side of the frames 6.

The feed passage 3 has ports 10 communicating with it and extending at right angles. These ports, however, only communicate with the open or unoccupied frame 5. These frames only are provided with air ports 11 at the top controlled by cocks not shown either in Figures 2, 3 or 4 but which when opened allow displacement of air so that the open frames 5 become fully filled with the feed liquid. Of course during operation the cocks controlling the air escape ports are closed. The frames 6 containing the filter elements, and those frames only, are furnished with drain ports 12 which are also controlled by drain cocks not shown in the drawings, but which would appear at the left hand bottom corner in Figure 4 and right hand bottom corner in Figure 2. These cocks are obviously open during ordinary filtering to allow of the escape of the clear filtrate, but they can be closed during the washing of the cake. The actual washing water is admitted, as already mentioned, through the longitudinal passage 4 and this passage has communicating with it a number of ports 13 which however only communicate with alternate frames 6 containing the filter elements, so that washing water which is admitted into these elements flows backwardly through the filter cloths and through the cake and the preferred arrangement is to have the drain cocks open in every other element and to supply washing water only to the elements in which the drain cocks are kept closed, so that the washing water after traversing the cake escapes through the open drain cocks. It is clear, however, as already mentioned, that by small modification of the arrangement of ports other methods of washing may be employed with the novel filter press.

Figure 5 shows a cross-section to an enlarged scale of adjacent elements and shows how the sponge rubber 7 in the frames 6 is compressed leaving a space 14 for the deposit of filter cake of considerably larger volume than the original space in the open frames 5.

It is to be noted that leaving out of account the passages and ports for feeding the liquid to be filtered and discharging the filtrate and washing liquid, all the frames may be identical. There are no solid plates employed so that the amount of ineffective space for the formation of cake is very much decreased. It can be appreciated from Figure 5 in particular that the amount of ineffective space may be about a quarter of that in an ordinary plate and frame filter press.

It is preferred when employing sponge 7, to use that kind in which the air spaces are open and continuous and are not enclosed within the body of the rubber. The form of sponge rubber, however, in which there are enclosed air spaces may be used, and the required thickness of the sheet may be determined from tests, such as tests for ultimate compression, porosity, specific gravity, and so forth. The invention, however, is not limited to the use of sponge rubber and, for example, pure gutta-percha might be employed, but in that case in order to enable it to be compressed holes should be cut or otherwise formed in it.

Another alternative is shown in Figure 6 where the frame 6 contains an element consisting of a pneumatic cushion 15 blown up to the desired pressure through a suitable air valve 16, all the other parts being unchanged.

In addition to the advantages already mentioned, the invention exhibits certain advantages in operation. Thus it is known that the most economic thickness of cake varies with different feed materials. In the novel filter press, the space for the formation of cake, and therefore the thickness of cake which can be produced, may be varied within wide limits by increasing or decreasing the resiliency of the cushions or by inserting non-compressible plates into the filter elements without changing the resiliency of the cushions. One press can therefore be modified to produce cakes of any desired thickness and one press will not make cakes of one particular thickness and no other.

The filter cake is deposited on a continuously receding filter cloth and therefore any layer which is impermeable and tends to become bonded, constantly has its continuity broken up. The result is the cake is formed by a lower pressure and more quickly and for the same reason the washing is more effective. Satisfactory washing is only possible in a cake which exerts the same resistance to flow to the washing liquor over its whole surface. For exactly the same reason, when the press is opened and the resilient cushion expands, any firm connection between the cake and the filter cloth is broken at once so that the cake comes away much more easily than with ordinary filter presses. Not only, therefore, is the first cost of the filter press considerably reduced but also the operating cost for a given weight of cake. The construction of the units is calculated also to reduce breakage or bursting of the canvas filter cloths.

I claim:—

1. A filter press comprising in combination, a series of hollow flat frames clamped together, a plurality of compressible and expansible cushions enclosed in said frames, and a filter cloth covering each of said cushions, the whole of the effective filtering surface of said filter cloth being maintained in intimate engagement with substantially the whole of the lateral surfaces of said cushions, each of said cushions being inherently resilient so that under the pressure of the feed the cushions contract to a substantial extent, whereby the capacity of the space for the filter cake is increased.

2. A filter press comprising in combination, a series of hollow flat frames clamped together, a plurality of compressible and expansible cushions disposed in said frames, and a filter cloth encasing each of said cushions, the arrangement being such that during filtering the entire effective filtering surface of said filter cloth is caused to bed against said cushions, and due to the pressure of the feed the cushions contract to a substantial extent so that the filter cloth recedes continuously during formation of the filter cake.

3. A filter press comprising in combination, a series of hollow flat frames clamped together, pads of perforated soft rubber mounted in said frames, and a filter cloth enclosing each of said pads, so that under the pressure of the feed said pads contract and provide spaces for accommodating the filter cake.

4. A filter press comprising in combination, a series of hollow flat frames clamped together, pads of spongy rubber disposed in alternate of said hollow frames, a filter cloth encasing each of said pads, the frames without the pads being formed with ports for the feed of material to be filtered, and a feed manifold in communication with said ports, the frames containing said pads being formed with outlet ports through which the filtrate passes after percolating through said filter cloth.

5. A filter press comprising in combination, a series of hollow flat frames clamped together, contractible and expansible cushions disposed in alternate of said frames, a filter cloth enclosing each of said cushions, the entire filtering surface of said filter cloth being in intimate engagement with substantially the whole of the lateral surfaces of said cushions, so that under the pressure of the feed the cushions contract to a substantial extent and provide spaces for accommodating the filter cake, the frames without cushions being formed with ports for the feed of the material to be filtered, and a feed manifold in communication with said ports, the frames containing said cushions being provided with outlet ports for the escape of the filtrate.

6. A filter press comprising in combination, a series of hollow flat frames clamped together, pads of spongy rubber disposed in alternate frames, the frames without the pads being formed with ports for the feed of the material to be filtered, a feed manifold in communication with said ports, and a filter cloth enclosing said jute sacking.

7. A filter press comprising in combination, a series of hollow flat frames clamped together, a plurality of pneumatic cushions enclosed in said frames, and a filter cloth covering the outer faces of said cushions, so that under the pressure of the feed, the cushions contract and provide spaces for accommodating the filter cake.

8. A filter press comprising in combination, a series of hollow flat frames clamped together, pneumatic cushions disposed in said frames, a layer of jute sacking encasing each of said cushions, and a filter cloth enclosing said jute sacking, so that under the pressure of the feed the cushions contract and provide spaces for accommodating the filter cake.

9. A filter press comprising in combination, a series of hollow flat frames clamped together, pneumatic cushions disposed in alternate of said hollow frames, the frames without said cushions being furnished with ports for the feed of the material to be filtered, a feed manifold communicating with said ports, and a filter cloth enclosing each of said cushions, the frames containing the cushions being formed with outlet ports through which the filtrate drains after percolating through said filter cloth.

10. A filter press comprising in combination, a series of hollow flat frames clamped together, a plurality of contractible and expansible cushions disposed in said frames, a layer of jute sacking encasing each of said cushions, and a filter cloth surrounding said jute sacking in intimate engagement with substantially the whole of the lateral surfaces of said cushions, each of said cushions being inherently resilient so that under the pressure of the feed the cushions contract to a substantial extent and provide spaces for accommodating the filter cake.

11. A filter press comprising in combination, a supporting structure, a plurality of hollow flat frames mounted in said structure, contractible and expansible cushions disposed in said frames, a filter cloth encasing each of said cushions, and means for squeezing said frames together, the arrangement being such that during filtering the entire effective filtering surface of said filter cloth is caused to bed against said cushions, and due to the pressure of the feed the cushions contract so that the filter cloth recedes continuously during formation of the filter cake.

HENRY THOMAS DURANT.